United States Patent [19]
Fletcher et al.

[11] 3,763,740
[45] Oct. 9, 1973

[54] COLLAPSIBLE PISTONS

[76] Inventors: James C. Fletcher, Administrator of the National Aeronautics and Space Administration with respect to an invention of; Robert N. Teng, Torrance, Calif.

[22] Filed: July 27, 1971

[21] Appl. No.: 166,487

[52] U.S. Cl. ............................ 89/8, 102/95, 188/1 C
[51] Int. Cl. .............................................. F41f 1/00
[58] Field of Search .................. 188/1 B, 1 C; 89/7, 89/8, 1; 102/42 C, 43 C, 95

[56] References Cited
UNITED STATES PATENTS

| | | | |
|---|---|---|---|
| 3,024,749 | 3/1962 | Haskell et al. ........................ | 188/1 C |
| 3,653,468 | 4/1972 | Marshall .............................. | 188/1 C |
| 3,352,189 | 11/1967 | Brown .................................... | 89/1 B |
| 3,623,431 | 11/1971 | Hendricks ........................... | 102/42 C |
| 2,997,325 | 8/1961 | Peterson ............................... | 188/1 B X |
| 2,882,796 | 4/1959 | Clark et al. ............................ | 89/7 |
| 3,311,020 | 3/1967 | Piacesi et al. .............................. | 89/8 |
| 3,604,355 | 9/1971 | Greenlees .......................... | 102/43 C |

*Primary Examiner*—Samuel W. Engle
*Attorney*—Marvin J. Marnock et al.

[57] ABSTRACT

A piston assembly for use in a hypervelocity gun comprising a forward cylindrical section longitudinally spaced from a rearward cylindrical section by an intermediate section. The intermediate section is longitudinally collapsible when subjected to a predetermined force, to allow the distance between the forward and rearward sections to be suddenly reduced.

5 Claims, 10 Drawing Figures

PATENTED OCT 9 1973 3,763,740

ROBERT N. TENG
INVENTOR.

BY M. J. Marnock
ATTORNEY

COLLAPSIBLE PISTONS

ORIGIN OF THE INVENTION

The invention described herein was made in the performance of work under NASA Contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

The present invention relates to high velocity guns. More specifically, it pertains to improved pistons for use in light-gas guns for attaining extremely high projectile velocities. increases, Light-gas guns utilizing the present invention could be used in controlled laboratory tests requiring hypervelocity projectile acceleration. For example, light-gas guns are presently used in the NASA space program to study the impact phenomena resulting from collision of high-speed meteroids with space vehicle structure.

2. Brief Description of the Prior Art

Light-gas guns are sophisticated artillery-like devices used to launch projectiles under controlled laboratory conditions to velocities of a magnitude greater than that of ordinary artillery pieces. Typical maximum muzzle velocities of 30,000 feet per second are obtained from light-gas guns.

A conventional light-gas gun may comprise a combustion chamber; a second adjoining gas sealed chamber, containing pressurized gas of low molecular weight (generally hydrogen); and a launch tube. A piston member usually separates the two chambers and, upon combustion of gun powder in the combustion chamber, the piston is driven into the second chamber to further compress the low molecular weight gas. A pressure rupture device, mounted at the launch tube end of the second chamber or attached to the projectile itself, is ruptured when the low molecular weight or "light" gas is suitably compressed, allowing the light gas to expand and propel the projectile through the launch tube. The light gas flowing along the launch tube, driving the projectile, provides a higher muzzle velocity than powder gases alone because of the higher acoustic velocity attainable in the lighter gas. Examples of prior art light-gas guns can be seen in U.S. Pat. Nos. 2,872,846 and 3,326,084.

Maximum velocities are obtained if the pressures on the base of the projectile are optimum and sustained during the launching phase. Once the projectile starts to move down the launch tube, the projectile base pressure will remain optimum and sustained only if the pressure of the gas in the second chamber continues to increase in an ideal manner. The rate of increase, to be ideal, must be low while the projectile is still near the breach end of the launch tube, and must be significantly higher as the projectile nears the muzzle and is moving faster. Departures from the ideal produce several serious problems, namely, too low a muzzle velocity if the rate is low and, more important, gun and/or projectile failure by overpressurization if the rate is too high. A solid piston, as used in the prior art, moving at a low speed produces pressures which are too low at the end of the launch cycle and similarly, a solid piston moving at a high speed produces pressures which are too high at the beginning of the launch cycle.

One solution proposed to remedy this situation is disclosed in U.S. Pat. No. 3,465,638. In this solution a cylindrically shaped high explosive charge surrounds the exterior of a portion of the launch tube and is provided with an initiator which is fired to cause the high explosive charge to explode progressively along the exterior of the launching tube in the axial direction to produce a continuously advancing detonation front. As a consequence thereof, the propellant gas is continuously compressed to produce a continuously advancing shock wave front which impinges on the projectile to propel it along the launching tube toward the open end thereof. Thus a more constant projectile base pressure is obtained. It is claimed that projectile velocities of 40,000 feet per second can be attained by this method. However, such a method appears to be less safe than some other methods and requires replacement of the entire gun after each firing.

SUMMARY OF THE INVENTION

In the present invention an improved piston is disclosed which may be used in light-gas guns to overcome the inherent problems of the heretofore used solid pistons. The invention comprises a collapsible piston which permits a slow pressure buildup early in the cycle and a delayed buildup late in the cycle, thus more nearly approaching the ideal as previously discussed.

With the collapsible piston of the invention, at least a 20 percent increase in muzzle velocity may be attained over the conventional light-gas guns. Lower peak accelerations are experienced by the projectile, resulting in less potential for projectile failure. Lower peak pressures are experienced by the high pressure gun components, resulting in less potential for gun failure due to overpressurization and fatigue. Furthermore, maintenance and replacement costs for high pressure gun components are reduced by minimizing yielding of metal. Other objects and advantages of the invention will be apparent from the description which follows.

BRIEF DESCRIPTION OF THE DRAWINGS

In the following description reference will be made to the accompanying drawings in which.

DESCRIPTION OF THE PREFERRED EMBODIMENTS

Figure 1:
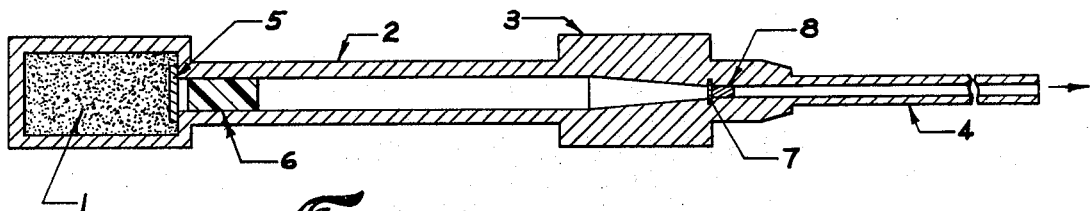
FIG. 1 is a schematic representation of a light-gas gun in its prefire position.
Figure 2:
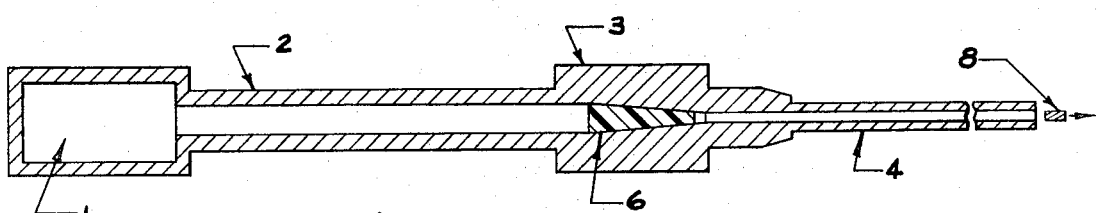
FIG. 2 is a schematic representation of the light-gas gun of FIG. 1 in its postfire position.

Referring first to FIGS. 1 and 2, the operation of a typical light-gas gun will be described. The gun may comprise a combustion chamber 1, a pump tube 2, high pressure or compression section 3, and a launch tube 4. Moving and expendable parts may comprise a pump tube diaphragm 5, a piston member 6, a launch tube diaphragm 7, and a saboted projectile 8. Prior to firing, the piston 6 and sabot and projectile 8 are positioned as shown in FIG. 1. The pump tube 2 is precharged with a low molecular weight gas, such as hydrogen, and the combustion chamber 1 is loaded with a gun powder charge. To initiate firing, the gun powder charge in combustion chamber 1 is ignited, producing hot, high pressure gases. When the pressure in combustion chamber 1 reaches a predetermined level, optimum for gun powder combustion rate and piston launch accelerations, the pump tube diaphragm 5 ruptures, exposing the rear end of piston 6 to the high pressure combustion gases. The piston 6 moves at high velocity compressing the low molecular weight gas in pump tube 2, between the piston 6 and the launch tube diaphragm 7. As the piston 6 approaches the high pressure section 3, the light gas is increasingly compressed to a high pressure and high temperature, ultimately reaching a level of magnitude substantially greater than that produced in the combustion chamber 1. At a predetermined optimum level, the launch tube diaphragm 7 bursts and exposes the base of the sabot 8 to the launch gases. (A sabot is a special device used to hold and protect the projectile and prevent blowby of the launching gases.) The projectile and sabot 8 accelerate and exit at the muzzle end of the launch tube 4. The forward end of the piston 6 is compressed and assumes the postfire position shown in FIG. 2.

A typical piston member may be cylindrically shaped as shown in FIG. 1. Such a piston reaches its peak velocity quickly after the launch tube diaphragm ruptures, then it begins and continues to decelerate. Thus, a considerably less than optimum projectile base pressure is maintained. (See Curve A in FIGS. 3 and 4).

Figure 5A:
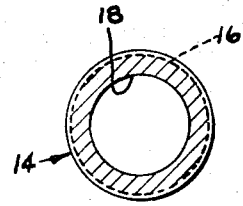
FIG. 5A is a transverse cross-section of the embodiment of FIG. 5 taken along line 5A–5A thereof.
Figure 5:
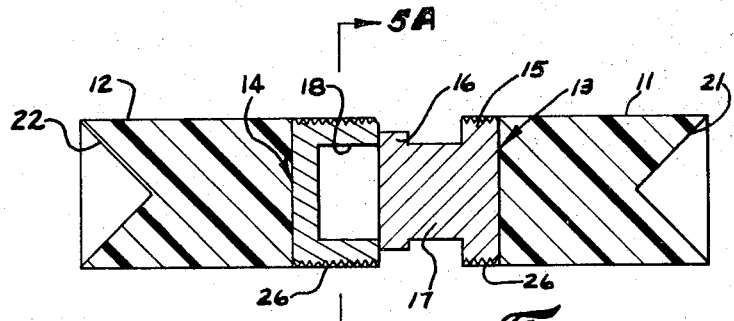
FIG. 5 is a longitudinal cross-section of a collapsible piston according to a preferred embodiment of the invention.

Referring now to FIGS. 5 and 5A, a collapsible piston according to a preferred embodiment of the invention will be described. Such a piston may comprise a forward cylindrical section 11, a rearward cylindrical section 12 and an intermediate collapsing section or shear piston assembly comprising male member 13 and female member 14. The front and rear cylindrical section 11, 12 may be formed with inverted conical surfaces at their exposed ends 21, 22, respectively. The male member 13 of the shear piston assembly may comprise a cylindrical base portion 15 connected to a smaller diameter annular shear flange 16 by an intermediate and yet smaller diameter cylindrical portion or shear portion 17. The female member 14 of the shear piston assembly, whose outer diameter may be substantially equal to the outer diameter of section 11, 12 and base 15, may be counterbored to provide a cylindrical cavity 18 of a diameter less than the diameter of shear flange 16 and slightly greater than the diameter of the shear piston 17 of the male member 13. The forward and rearward sections 11 and 12 may be conveniently formed of polyethylene. The male and female members 13 and 14 of the shear piston assembly might be made of steel with an antigall surface 26 of polycarbonate.

Figure 3:
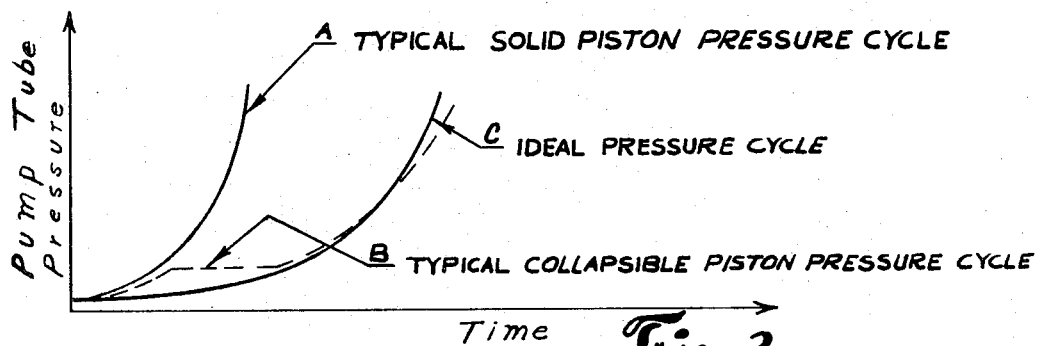
FIG. 3 is a graphic representation of pump tube pressure versus time, showing a typical solid piston pressure cycle and a typical collapsible piston pressure cycle in comparison with the ideal pressure cycle.
Figure 4:
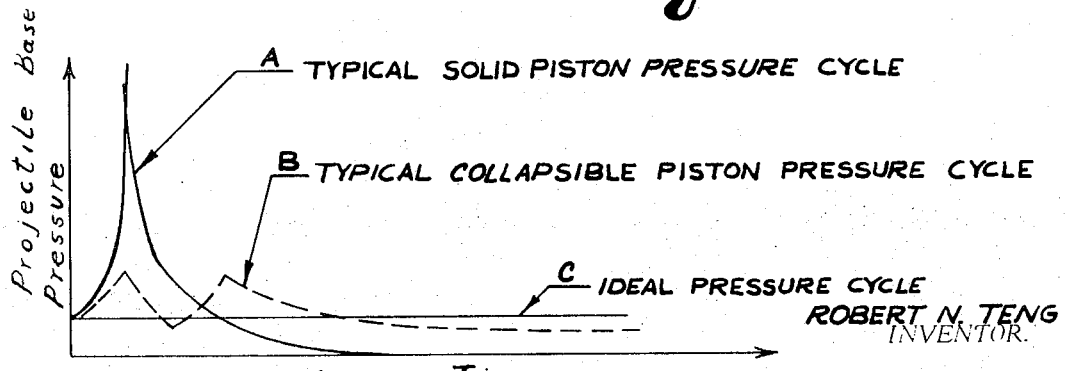
FIG. 4 is a graphic representation of projectile base pressure versus time, showing a typical solid piston pressure cycle and a typical collapsible piston pressure cycle in comparison with the ideal pressure cycle.

A light-gas gun equipped with such a piston would function much the same as described heretofore, except for the action produced by the collapsing principle. As before, the piston assembly would travel down the pump tube, compressing the gas in front of the piston, until the launch tube diaphragm ruptured, commencing the launching of the projectile. At some time, depending upon the chosen failure strength of the collapsing mechanism, the shear flange 16 would begin to fail in shear. This failure temporarily disconnects the front section 11 and male members 13 from the rear section 12 and the female member 14. In effect, the front section 11 and the male member 13 are axially displaced from the rear section 12 and female member 14 by say, one-half inch. A short time later, the rear section 12 and female member 14 catch up with the front section 11 and male member 13, as the shear piston 17 telescopically engages the counterbore 18, further compressing the driving gas. As shown in FIG. 3, the compression cycle for the collapsible piston more nearly approaches the ideal pressure cycle than does the typical solid piston. Consequently the collapsible piston projectile base pressure cycle much more closely approaches the ideal condition, as illustrated by FIG. 4.

Figure 6A:
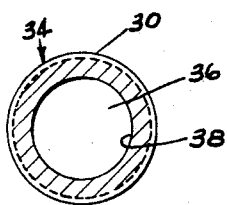
FIG. 6A is a transverse cross-section of the embodiment of FIG. 6 taken along line 6A–6A thereof.
Figure 6:
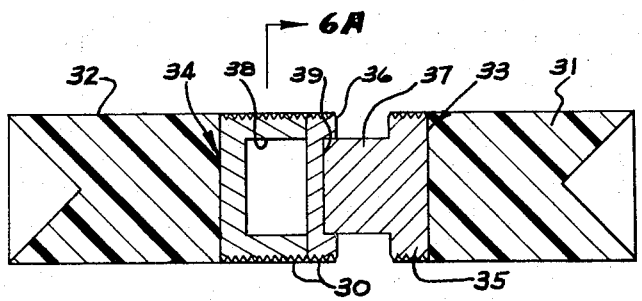
FIG. 6 is a longitudinal cross-section of a collapsible piston according to another preferred embodiment of the invention.

A collapsible piston assembly of an alternate design is shown in FIGS. 6 and 6A. In this embodiment, the forward and rear sections 31, 32 may be the same. The intermediate section may be changed by replacing the shear flange 16 of the previous embodiment with a shear disc 36. The female member 34 is substantially the same as the female member 14 of the previously described embodiment. As before, this piston assembly travels down the pump tube, compressing the gas in front of the piston assembly until the launch tube diaphragm ruptures, commencing the launch of the projectile. At a time dependent upon the failure strength of the collapsing assembly, the shear disc 36 begins to fail and in effect separates the front section 31 and male member 33 from the rear section 35 and female member 34. Shortly thereafter, the trailing section 35 and female member 34 catch up with the front section 31 and male member 33, as the shear piston 37 engages the counterbore 38, to further compress the driving gas. The resulting pump tube and projectile base pressure cycles are, as in the first embodiment described, and as illustrated in FIGS. 3 and 4, much closer to the ideal pressure cycles than the typical solid piston. Depending upon the collapsing pressure desired, the materials of the collapsible piston may be varied. For example the male member 33, female member 34, and shear disc 36 could be made of aluminum. Antigall grooves 30 can be machined on the exterior of each of these members. Or the male member 33 could be made of aluminum while the female member 34 and shear disc 36 could be of glass reinforced expoxy resin. These materials are merely given as being suitable. Many other materials would also be suitable.

Figure 7A:
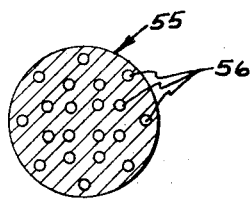
FIG. 7A is a transverse cross-section of the embodiment of FIG. 7 taken along lines 7A–7A thereof.
Figure 7:
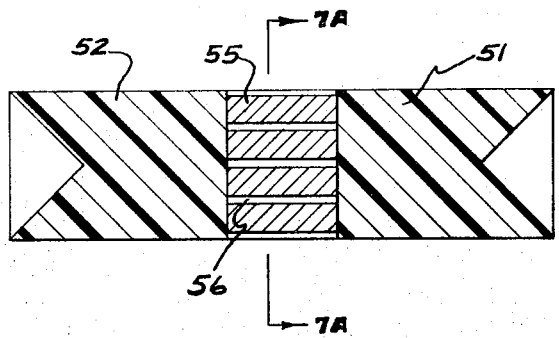
FIG. 7 is a longitudinal cross-section of a collapsible piston according to still another embodiment of the invention.

Still another embodiment of the invention is shown in FIGS. 7 and 7A. This embodiment is designed to avoid the possible adverse movement of the front section 51 during the period of disconnecting from the rear section 52. Should the front section 51 exhaust its energy during this period, it might rebound in the high pressure section of the light-gas gun momentarily causing a sudden drop in the driving pressure. The piston assembly of this embodiment is capable of retarding the push of the rear section 52 while continuously exerting a mild pressure on the front section 51 during the period of retardation. This is accomplished through the principle of compression collapse by plastic flow. The intermediate section comprises a porous disc 55 which is drilled with multiple longitudinal holes 56. When the pressure in the light-gas gun high pressure section increases to a certain point, the disc material begins to fail and flow into its void areas. The initial collapse rate is high. However, as the disc continues to collapse the net porosity decreases, causing resistance to further collapse to build up. This phenomenon occurs as a continuous process producing a variably increasing resistance and terminates as gun forces begin to subside. The front and rear sections 51, 52 may conveniently be made of polyethylene while the disc 55 may be made of polycarbonate.

Referring again to FIGS. 3 and 4, one can see how much closer the pressure cycle for a typical collapsible piston (Curve B) comes to the ideal pressure cycle (Curve C). These curves clearly show why collapsible pistons, according to the present invention, can produce muzzle velocities up to 45,000 feet per second as compared to typical muzzle velocities of 30,000 feet per second in the prior art. Such an improvement in efficiency and increased muzzle velocity amounts to a scientific breakthrough in hypervelocity gun art.

Although three different configurations and four combinations of materials have been described herein, many variations of the invention can be produced by changing materials, weights, controlled shear areas, etc. Each can be tailored to collapse at a unique pressure level so that a family of piston pressure cycle curves (similar to the ones shown in FIG. 3) can be developed with different collapsing times. The scope of the invention is intended to be limited only by the claims which follow.

I claim:

1. A hypervelocity gun comprising: a combustion chamber; a pump tube connected at one end to said combustion chamber; a launch tube connected to said pump tube in axial alignment therewith and adapted to receive a projectile for mounting in the rearward end of said launch tube; and a piston assembly mounted in said pump tube and exposed at its forward end to pressurized low molecular weight gas and exposable at its rearward end to combustion gases emanating from said combustion chamber for forcing said piston assembly toward said projectile when mounted in said launch tube and further compressing said low molecular weight gas for propelling said projectile at hypervelocities, said piston assembly being adapted to collapse longitudinally after said low molecular weight gas has been compressed to a predetermined pressure so as to provide a pressure cycle at the base of said projectile which increases, decreases, and then increases again; said piston assembly comprising a forward cylindrical section, a rearward cylindrical section, and a frangible longitudinally collapsible intermediate section therebetween, said frangible portion being adapted to fail when the low molecular weight gas reaches said predetermined pressure whereby there is an inelastic, longitudinal collapse of said piston assembly.

2. A hypervelocity gun as set forth in claim 1 characterized in that said intermediate section comprises a first cylindrical body having a counterbore therein surrounded by an annular shoulder; a second member comprising a cylindrical portion of a diameter less than the diameter of said counterbore, and a frangible member between said first and second members separating said first and second members in longitudinally spaced relationship and being adapted to fail when the low molecular gas reaches said predetermined pressure thereby allowing said first and second members to assume a second and closer longitudinally spaced relationship.

3. A hypervelocity gun as set forth in claim 2, characterized in that said frangible member comprises an annular flange member at one end of said piston portion and in contact with said annular shoulder.

4. A hypervelocity gun as set forth in claim 2, characterized in that said frangible member comprises a disc member, one side of which contacts one end of said piston portion, the other side of which contacts said annular shoulder.

5. A hypervelocity gun as set forth in claim 1, characterized in that said intermediate section comprises a disc member having a plurality of radially spaced longitudinally extending voids therein, said disc member being longitudinally compressible when said molecular weight gas reaches said predetermined pressure by the failure and flow of the material of said disc member into said voids.

* * * * *